United States Patent
Narayan et al.

(10) Patent No.: US 10,655,671 B2
(45) Date of Patent: May 19, 2020

(54) NESTED BUSHING ARRANGEMENT

(71) Applicant: GOODRICH CORPORATION, Charlotte, NC (US)

(72) Inventors: Karthik Narayan, Milton (CA); Man Hung Pang, Oakville (CA)

(73) Assignee: Goodrich Corporation, Charlotte, NC (US)

(*) Notice: Subject to any disclaimer, the term of this patent is extended or adjusted under 35 U.S.C. 154(b) by 362 days.

(21) Appl. No.: 15/585,834

(22) Filed: May 3, 2017

(65) Prior Publication Data

US 2018/0187765 A1 Jul. 5, 2018

Related U.S. Application Data

(60) Provisional application No. 62/440,109, filed on Dec. 29, 2016.

(51) Int. Cl.
*F16C 7/02* (2006.01)
*F16C 9/04* (2006.01)
*F16C 33/10* (2006.01)

(52) U.S. Cl.
CPC .............. *F16C 7/02* (2013.01); *F16C 9/04* (2013.01); *F16C 33/1065* (2013.01)

(58) Field of Classification Search
CPC .... F16C 7/02; F16C 2326/43; F16C 33/1065; F16C 33/102; F16C 9/04; F16C 17/02; F16C 11/10; F16C 43/02; F16C 7/023; B60G 2206/11; Y10T 74/2154; Y10T 403/7047
USPC ............................................ 403/365; 74/588
See application file for complete search history.

(56) References Cited

U.S. PATENT DOCUMENTS

| | | | |
|---|---|---|---|
| 4,020,712 A | 5/1977 | McKeon et al. | |
| 4,729,754 A | 3/1988 | Thuerman | |
| 7,406,777 B2* | 8/2008 | Grover | B23P 9/025 33/645 |
| 7,789,344 B2* | 9/2010 | Cousin | B64D 27/12 244/54 |
| 8,128,308 B2* | 3/2012 | Skinner | B23P 9/025 29/507 |
| 8,870,461 B2* | 10/2014 | Hansen | F16C 17/12 384/291 |
| 2003/0077011 A1 | 4/2003 | Hall | |

(Continued)

FOREIGN PATENT DOCUMENTS

| | | |
|---|---|---|
| CN | 2826058 | 10/2006 |
| DE | 3109565 | 10/1982 |

(Continued)

OTHER PUBLICATIONS

European Patent Office, European Search Report dated Feb. 5, 2018 in Application No. 17210981.-1013.

(Continued)

*Primary Examiner* — Josh Skroupa

(74) *Attorney, Agent, or Firm* — Snell & Wilmer, L.L.P.

(57) ABSTRACT

A nested bushing arrangement may comprise a first nested bushing coupled to a second nested bushing. Each nested bushing may comprise a mating aperture located opposite an annulus body. The annulus body of each nested bushing may insert within the mating aperture of the opposite nested bushing to couple the first nested bushing to the second nested bushing.

16 Claims, 7 Drawing Sheets

(56) References Cited

U.S. PATENT DOCUMENTS

| | | | | |
|---|---|---|---|---|
| 2003/0143022 A1* | 7/2003 | Jager | ................. | F16C 7/023 |
| | | | | 403/345 |
| 2005/0262682 A1* | 12/2005 | Grover | ................. | B23P 9/025 |
| | | | | 29/428 |
| 2008/0067286 A1* | 3/2008 | Cousin | ................. | B64D 27/12 |
| | | | | 244/54 |
| 2015/0061373 A1 | 3/2015 | Steiner et al. | | |
| 2016/0290391 A1* | 10/2016 | Hill | ................. | F16C 17/12 |

FOREIGN PATENT DOCUMENTS

| | | |
|---|---|---|
| DE | 202013105002 | 11/2013 |
| EP | 0712741 | 5/1996 |
| GB | 2066177 | 7/1981 |
| WO | 2014023336 | 2/2014 |

OTHER PUBLICATIONS

European Patent Office, European Office Action dated Jun. 13, 2019 in Application No. 17210981.1.

\* cited by examiner

NESTED BUSHING ARRANGEMENT

CROSS REFERENCE TO RELATED APPLICATIONS

This application is a nonprovisional application of and claims priority to U.S. Provisional Patent Application Ser. No. 62/440,109, filed Dec. 29, 2016, entitled "NESTED BUSHING ARRANGEMENT," which is incorporated herein by reference in its entirety.

FIELD

The present disclosure relates to bushing arrangements, and more specifically, to a nested bushing arrangement for structural components.

BACKGROUND

Typical bushing arrangements for short and/or narrow structural components may encounter operational issues. For example, in order to provide grease to lugs, multiple bushings having small engaged lengths may be used. The small engaged lengths may provide a gap between each installed bushing to allow greasing of a pin-to-bushing interface. Bushings having small engaged lengths may come loose during operation after a relatively short time in service because the small engaged lengths provide poor bushing retention.

SUMMARY

In various embodiments, a nested bushing arrangement is disclosed. The nested bushing arrangement may comprise a first bushing having a first tubular portion and a first flange that extends radially from near a first longitudinal end of the first tubular portion, the first flange having a first opening; and a second bushing having a second tubular portion and a second flange that extends radially from near a first longitudinal end of the second tubular portion, the second flange having a second opening. The first bushing and the second bushing may be sized and configured to allow a second longitudinal end of the first tubular portion to extend at least partially through the second opening while a second longitudinal end of the second tubular portion extends at least partially through the first opening.

In various embodiments, the at least partial engagement of the first tubular portion into the second opening may prevent rotation of the first bushing about the first tubular portion, and the at least partial engagement of the second tubular portion into the first opening may prevent rotation of the second bushing about the second tubular portion. Sn outer radial surface of the first tubular portion may be sized and shaped to be press fitted into a third opening in a member positionable between the first flange and the second flange while an outer radial surface of the second tubular portion may be sized and shaped to be press fitted into a fourth opening in the member. At least one of the first bushing and the second bushing may be formed as a single component. At least one of the first bushing and the second bushing may be additively manufactured. The first bushing and the second bushing may be geometrically the same. The first tubular portion may comprise at least one of a first inner greasing groove on a radially inner surface or a first outer greasing groove on the radially outer surface of the first tubular portion. The first tubular portion may comprise a first greasing groove defining an aperture on the first inner greasing groove or the first outer greasing groove. The second tubular portion may comprise at least one of a second inner greasing groove on a radially inner surface or a second outer greasing groove on the radially outer surface of the second tubular portion. The second tubular portion may comprise a second greasing groove defining an aperture on the second inner greasing groove or the second outer greasing groove.

In various embodiments, a nested bushing arrangement is disclosed. The nested bushing arrangement may comprise a first nested bushing having a first mating aperture defining a first void on a first outer surface of a flange end of the first nested bushing, and a first annulus defining a second void on the first outer surface of a first connecting end of the first nested bushing, wherein the first annulus comprises a first annulus body extending at a first length away from a first inner surface of the first nested bushing, and wherein the first mating aperture and the first annulus are separated by a first distance. The nested bushing arrangement may also comprise a second nested bushing having a second mating aperture defining a third void on a second outer surface of a flange end of the second nested bushing, and a second annulus defining a fourth void on the second outer surface of a second connecting end of the second nested bushing, wherein the second annulus comprises a second annulus body extending at a second length away from a second inner surface of the second nested bushing, wherein the second mating aperture and the second annulus are separated by a second distance. The first nested bushing may be configured to be coupled to the second nested bushing by inserting the first annulus body into the second mating aperture and the second annulus body into the first mating aperture.

In various embodiments, the first distance may be approximately equal to the second distance. The first annulus may comprise at least one of a first inner greasing groove on an inner surface of the first annulus body or a first outer greasing groove on an outer surface of the first annulus body. The first annulus may comprise a first greasing aperture defining a fifth void on the first inner greasing groove, wherein the first greasing aperture is configured to provide a fluid to at least one of the first inner greasing groove or the first outer greasing groove. The second annulus may comprise at least one of a second inner greasing groove on an inner surface of the second annulus body or a second outer greasing groove on an outer surface of the second annulus body. The second annulus may comprise a second greasing aperture defining a sixth void on the second inner greasing groove, wherein the second greasing aperture is configured to provide a fluid to at least one of the second inner greasing groove or the second outer greasing groove. The first nested bushing may be coupled to the second nested bushing using a shrink fit installation process. The first nested bushing may be coupled to the second nested bushing using a press fit installation process. At least one of the first nested bushing and the second nested bushing may be additively manufactured.

In various embodiments, a method of installing a nested bushing arrangement is disclosed. The method may comprise inserting a first annulus of a first nested bushing into a second mating aperture of a second nested bushing; and inserting a second annulus of the second nested bushing into a first mating aperture of the first nested bushing.

In various embodiments, at least one of the inserting the first annulus or inserting the second annulus is performed using a shrink fit process. At least one of the inserting the first annulus or inserting the second annulus using a press fit process.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1A:
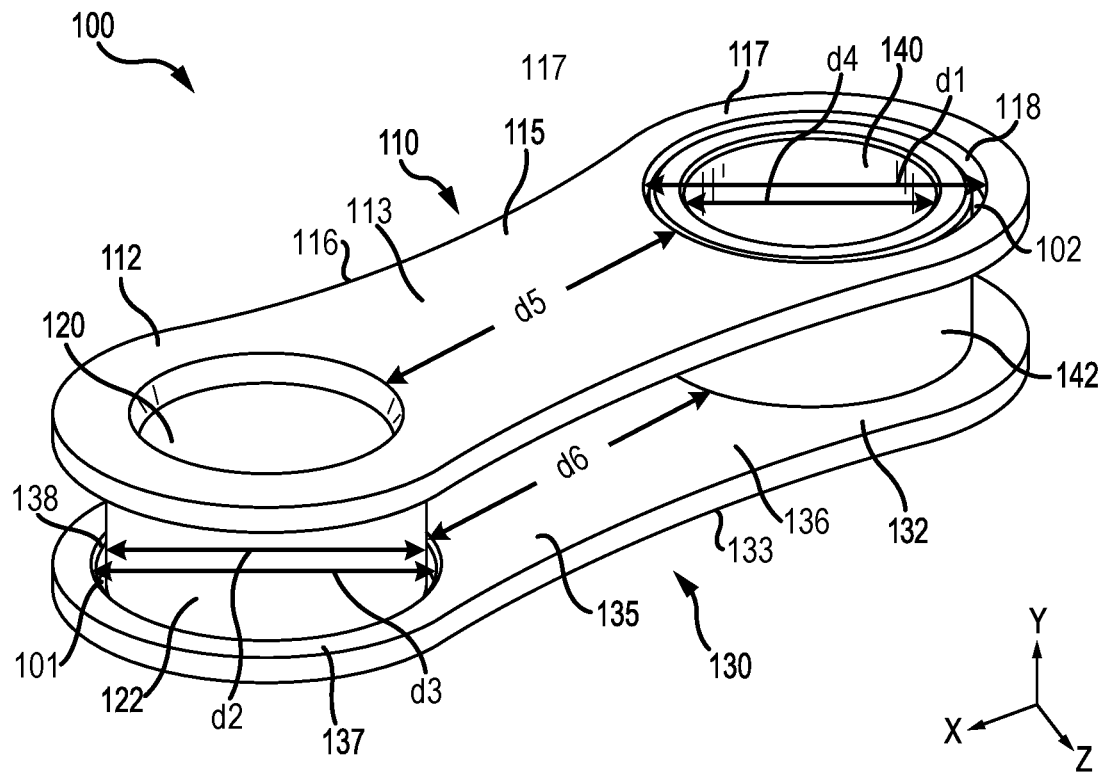
FIG. 1A illustrates a top perspective view of a nested bushing arrangement, in accordance with various embodiments.
Figure 1B:
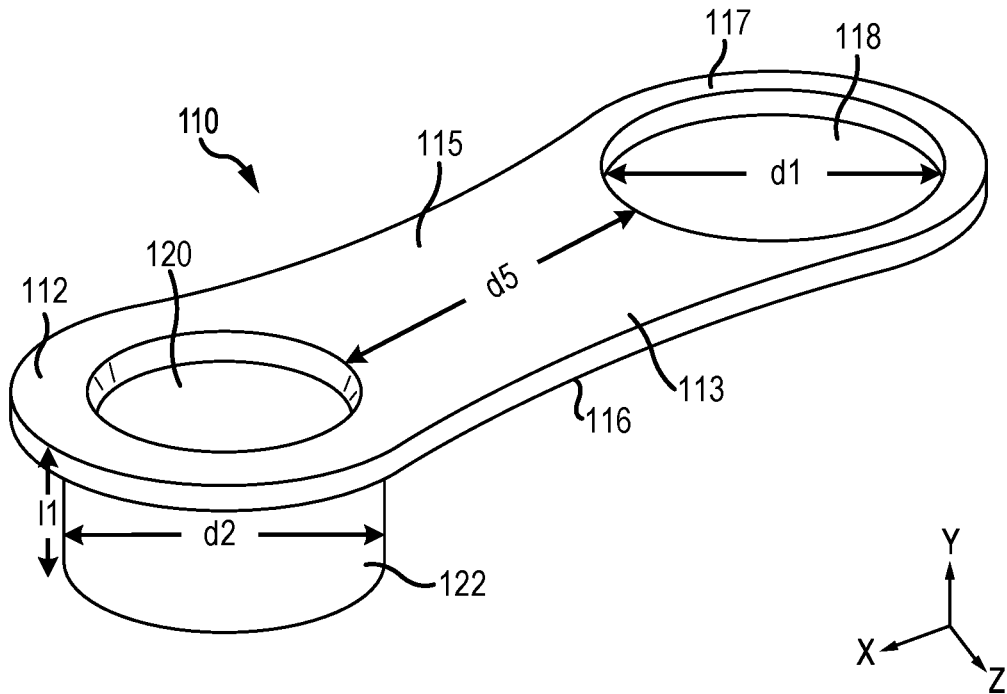
FIG. 1B illustrates a side perspective view of a first nested bushing, in accordance with various embodiments.
Figure 1C:
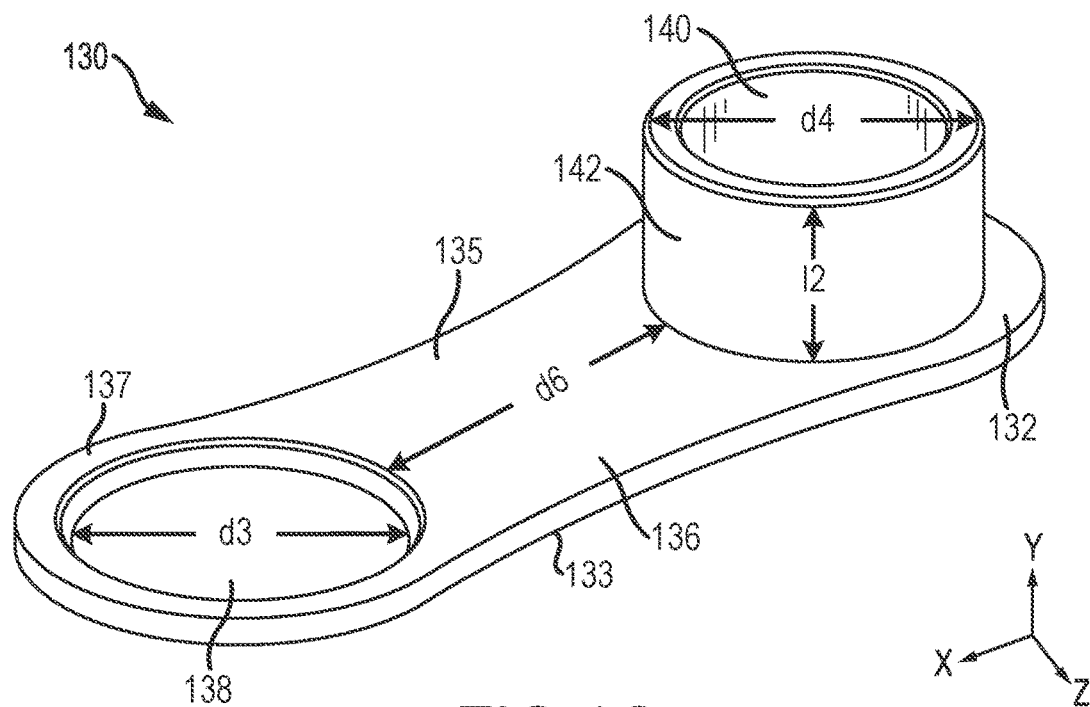
FIG. 1C illustrates a side perspective view of a second nested bushing, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

In various embodiments, and with reference to FIGS. 1A-1D, a nested bushing arrangement 100 is disclosed. Nested bushing arrangement 100 may increase bushing retention length in short and/or narrow structural components. For example, nested bushing arrangement 100 may be used in a lower lock link of a nose landing gear, and/or any other suitable structural component. Nested bushing arrangement 100 may also provide anti-rotation features for each bushing (e.g., first nested bushing 110 and second nested bushing 130) in response to one of the bushings becoming loose. An X-Y-Z axis is shown throughout the figures to illustrate the relative position of various components.

In various embodiments, nested bushing arrangement 100 may comprise a first nested bushing 110 (e.g., a first bushing) and/or a second nested bushing 130 (e.g., a second bushing). First nested bushing 110 and/or second nested bushing 130 may comprise a one-piece apparatus made using any suitable process, such as, for example, machining, investment casting, and/or the like (e.g., first nested bushing 110 and/or second nested bushing 130 may be formed as a single component). First nested bushing 110 and/or second nested bushing 130 may also comprise an assembly of parts. First nested bushing 110 and/or second nested bushing 130 may be made by an additive manufacturing process, such as, for example, fused deposition modeling, polyjet 3D printing, electron-beam freeform fabrication, direct metal laser sintering, electron-beam melting, selective laser melting, selective laser sintering, multiphoton polymerization, digital light processing, and/or any other suitable additive manufacturing process. Additive manufacturing techniques may enable the formation of complex contours on first nested bushing 110 and/or second nested bushing 130 (e.g., a first inner greasing groove 255 and a first outer greasing groove 256, and/or a second inner greasing groove 265 and a second outer greasing groove 266, with brief reference to FIG. 2). First nested bushing 110 and/or second nested bushing 130 may comprise any suitable material, such as, for example, any suitable bearing material, bushing material, and/or the like. For example, first nested bushing 110 and/or second nested bushing 130 may comprise a bronze alloy (e.g., aluminum nickel bronze), a stainless steel, and/or any other suitable material.

In various embodiments, first nested bushing 110 may comprise a first body 115 (e.g., a first flange). First body 115 may comprise a first connecting end 112 opposite a first flange end 117 along the X-axis. First body 115 may also comprise a first outer surface 113 opposite a first inner surface 116 along the Y-axis. First flange end 117 may comprise a first mating aperture 118 (e.g., a first opening). First mating aperture 118 may define a void on first outer surface 113 having a first inner diameter d1. First inner diameter d1 may comprise any suitable distance. For example, first inner diameter d1 may comprise a distance greater than a second annulus diameter d4, such that a second annulus body 142 of second nested bushing 130 may be inserted within first mating aperture 118.

In various embodiments, first connecting end 112 may comprise a first annulus 120 (e.g., a first tubular portion). First annulus 120 may define a void on first outer surface 113. First annulus 120 may comprise a first annulus body 122. First annulus body 122 may define the void and extend in the Y direction away from first inner surface 116 of first nested bushing 110. In that respect, first annulus body 122 may comprise a first annulus length l1 (e.g., a length in the Y direction). First annulus length l1 may comprise any suitable length, such as, for example, about 0.250 inches (0.635 cm) to about 0.300 inches (0.762 cm), about 0.300 inches (0.762 cm) to about 0.350 inches (0.889 cm), or about 0.350 inches (0.889 cm) to about 0.400 inches (1.016 cm) (wherein about in this context refers only to +/−0.01 inches (0.0254 cm)). First annulus body 122 may also comprise a first annulus diameter d2 (e.g., a width in the X direction). First annulus diameter d2 may comprise any suitable distance. For example, first annulus diameter d2 may be less than a second inner diameter d3, such that first annulus body 122 may be inserted within second mating aperture 138 (e.g., during coupling of first nested bushing 110 to second nested bushing 130). First annulus body 122 may also comprise any suitable shape, such as, for example, a cylindrical shape.

In various embodiments, first annulus 120 and first mating aperture 118 may be separated by a first distance d5 along the X axis (e.g., a first longitudinal end of the first tubular portion may be separated from the first opening of the first flange by the first distance d5). First distance d5 may comprise any suitable distance, such as, for example, about 1.50 inches (3.81 cm) to about 1.55 inches (3.937 cm), about 1.55 inches (3.937 cm) to about 1.60 inches (4.064 cm), about 1.60 inches (4.064 cm) to about 1.65 inches (4.191 cm), about 1.65 inches (4.191 cm) to about 1.70 inches (4.318 cm), and/or about 1.70 inches (4.318 cm) to about 1.75 inches (4.445 cm) (wherein about in this context refers only to +/−0.01 inches (0.0254)). In various embodiments, first distance d5 may be 1.65 inches (4.191 cm).

In various embodiments, second nested bushing 130 may comprise a second body 135 (e.g., a second flange). Second nested bushing 130 may be geometrically the same as first nested bushing 110. Second body 135 may be similar to first body 115. Second body 135 may comprise a second connecting end 132 opposite a second flange end 137 along the X-axis. Second body 135 may also comprise a second outer surface 133 opposite a second inner surface 136, along the Y-axis. Second connecting end 132 may be similar to first connecting end 112. Second flange end 137 may be similar to first flange end 117. Second outer surface 133 may be similar to first outer surface 113. Second inner surface 136 may be similar to first inner surface 116. Second flange end 137 may comprise a second mating aperture 138 (e.g., a second opening). Second mating aperture 138 may be similar to first mating aperture 118, and may define a void on second outer surface 133. Second mating aperture 138 may comprise a second inner diameter d3. Second inner diameter d3 may be similar to first inner diameter d1. For example, second inner diameter d3 may comprise a distance approximately equal to first inner diameter d1. Second inner diameter d3 may also comprise a distance greater than first annulus diameter d2, such that first annulus body 122 of first nested bushing 110 may be inserted within second mating aperture 138.

In various embodiments, second connecting end 132 may comprise a second annulus 140 (e.g., a second tubular portion). Second annulus 140 may be similar to first annulus 120. Second annulus 140 may define a void on second outer surface 133. Second annulus 140 may comprise a second annulus body 142. Second annulus body 142 may be similar to first annulus body 122. Second annulus body 142 may define the void and extend in the Y direction away from second inner surface 136. In that respect, second annulus body 142 may comprise a second annulus length l2 (e.g., a length in the Y direction). Second annulus length l2 may be similar to first annulus length l1. For example, second annulus length l2 may be approximately equal to first annulus length l1. Second annulus body 142 may also comprise a second annulus diameter d4 (e.g., a width in the X direction). Second annulus diameter d4 may be similar to first annulus diameter d1. In various embodiments, second annulus diameter d4 may be approximately equal to first annulus diameter d1. Second annulus diameter d4 may be less than first inner diameter d1 of first mating aperture 118, such that second annulus body 142 may be inserted within first mating aperture 118 (e.g., during coupling of first nested bushing 110 to second nested bushing 130).

In various embodiments, second annulus 140 and second mating aperture 138 may be separated by a second distance d6 along the X axis (e.g., a first longitudinal end of the second tubular portion may be separated from the second opening of the second flange by the second distance d6). Second distance d6 may be similar to first distance d5. For example, second distance d6 may be approximately equal to first distance d5.

Figure 1D:
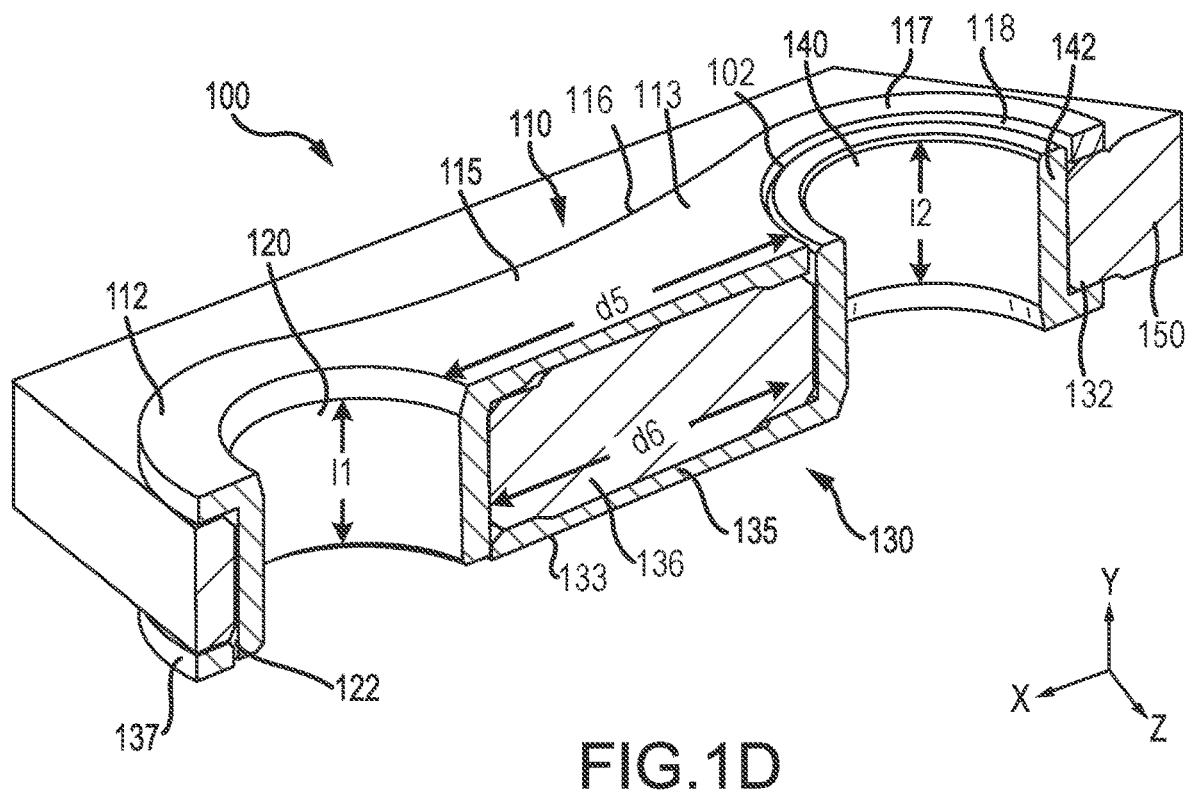
FIG. 1D illustrates a perspective cross-sectional view of a nested bushing arrangement, in accordance with various embodiments.

In various embodiments, and with reference to FIGS. 1A and 1D, first nested bushing 110 and second nested bushing 130 may be sized and configured to allow at least a portion of first annulus body 122 to extend within second mating aperture 138 while at least a portion of second annulus body 142 extends within first mating aperture 118. In various embodiments, nested bushing arrangement 100 may also comprise a first clearance gap 101 and/or a second clearance gap 102. An outer surface of first annulus body 122 and an inner surface of second mating aperture 138 may define the first clearance gap 101. An outer surface of second annulus body 142 and an inner surface of first mating aperture 118 may define the second clearance gap 102. Each clearance gap 101, 102 may be configured to limit rotation of first nested bushing 110 and/or second nested bushing 130, such as, for example, in response to one of the first nested bushing 110 and/or second nested bushing 130 becoming loose during operation. In that respect, and as discussed further herein, an at least partial engagement of first annulus 120 into second mating aperture 138 may at least partially limit (or prevent) rotation of first nested bushing 110 about first annulus 120, and/or an at least partial engagement of second annulus 140 into first mating aperture 118 may at least partially limit (or prevent) rotation of second nested bushing 130 about second annulus 140. Each clearance gap 101, 102 may also be configured to allow first nested bushing 110 and/or second nested bushing 130 to expand and/or contract during changes in temperature, such as, for example, during operation of a gas turbine engine.

Figure 2:
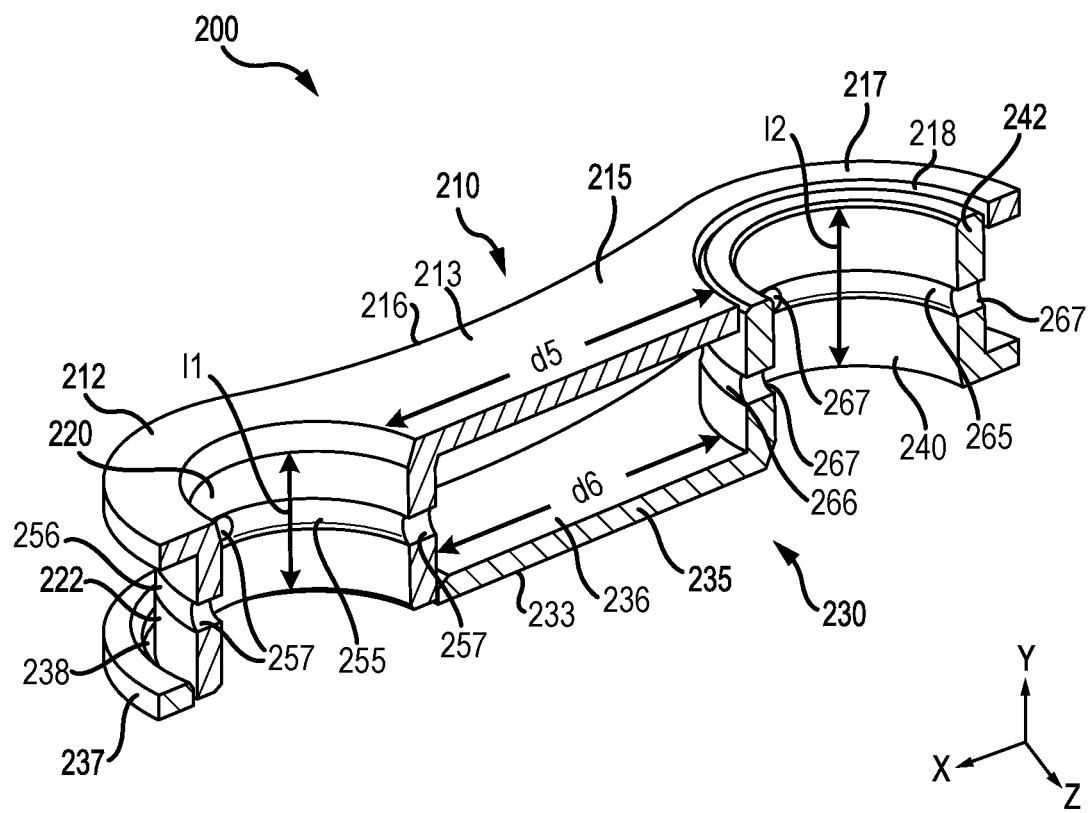
FIG. 2 illustrates a perspective cross-sectional view of a nested bushing arrangement comprising greasing grooves, in accordance with various embodiments.

In various embodiments, and with reference to FIG. 2, a first nested bushing 210 and a second nested bushing 230 may comprise various components to aid in greasing. For example, first nested bushing 210 may comprise a first inner greasing groove 255. First inner greasing groove 255 may define a circumferential groove on an inner surface of first annulus body 222. First inner greasing groove 255 may be configured to provide a fluid (e.g., grease or other lubricant), through first annulus body 222 (e.g., to lubricate a pin and/or other object inserted within first annulus body 222). In various embodiments, first nested bushing 210 may also comprise a first outer greasing groove 256. First outer greasing groove 256 may define a circumferential groove on an outer surface of first annulus body 222. First outer greasing groove 256 may be located radially opposite (e.g., along the X-axis) first inner greasing groove 255. First outer greasing groove 256 may be configured to further provide the fluid (e.g., grease or other lubricant) to lubricate first annulus body 222.

In various embodiments, second nested bushing 230 may comprise a second inner greasing groove 265. Second inner greasing groove 265 may be similar to first inner greasing groove 255. Second inner greasing groove 265 may define a circumferential groove on an inner surface of second annulus body 242. In various embodiments, second nested bushing 230 may also comprise a second outer greasing groove 266. Second outer greasing groove 266 may be similar to first outer greasing groove 256, Second outer greasing groove 266 may define a circumferential groove on an outer surface of second annulus body 242 located radially opposite second inner greasing groove 265. Second inner greasing groove 265 and second outer greasing groove 266 may be configured to provide a fluid (e.g., grease or other lubricant) to lubricate second annulus body 242.

In various embodiments, first inner greasing groove 255 may comprise a first greasing aperture 257. First greasing aperture 257 may define a void on the inner surface of first inner greasing groove 255. First greasing aperture 257 may be configured to receive the fluid from a fluid source, and deliver the fluid to first inner greasing groove 255 and/or first outer greasing groove 256. In various embodiments, second inner greasing groove 265 may comprise a second greasing aperture 267. Second greasing aperture 267 may be similar to first greasing aperture 257. Second greasing aperture 267 may define a void on the inner surface of second inner greasing groove 265. Second greasing aperture 267 may be configured to receive the fluid from a fluid source, and deliver the fluid to second inner greasing groove 265 and/or second outer greasing groove 266.

Figure 3A:
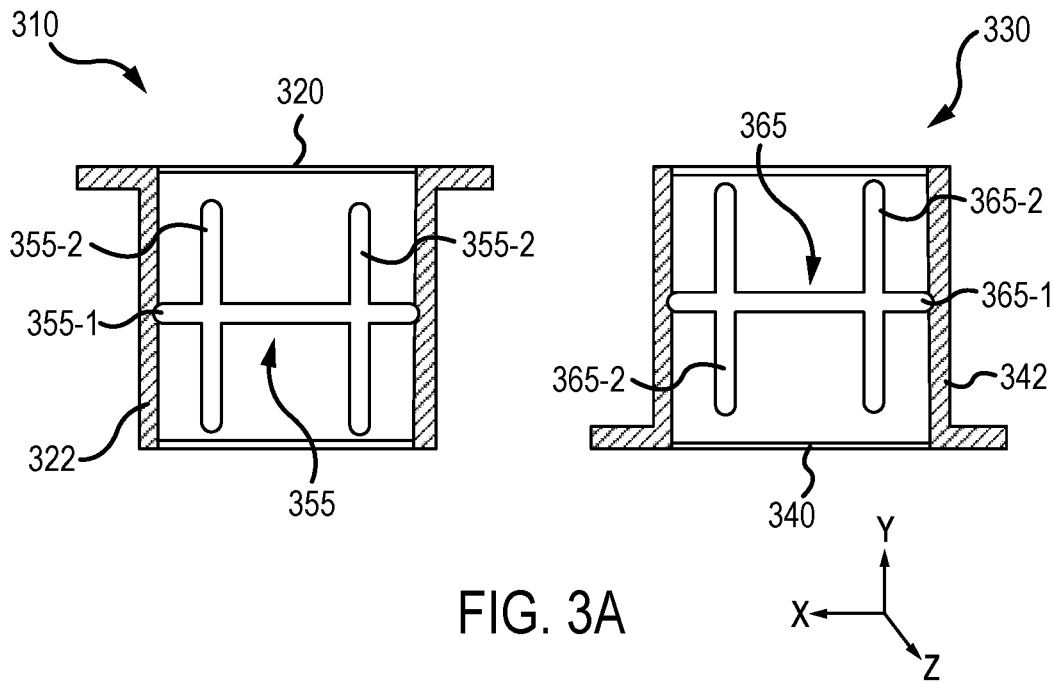
FIG. 3A illustrates a cross-sectional view of a nested bushing arrangement comprising inner circumferential and longitudinal greasing grooves, in accordance with various embodiments.

In various embodiments, first nested bushing 210 and/or second nested bushing 230 may also comprise greasing grooves, greasing apertures, and/or the like having any other suitable and/or desired configuration and distributions. For example, and with reference to FIG. 3A, a first nested bushing 310 may comprise a first inner greasing groove 355 having one or more first inner circumferential greasing grooves 355-1 and/or one or more first inner longitudinal greasing grooves 355-2. Each first inner circumferential greasing groove 355-1 may define a circumferential groove on the inner surface of first annulus body 322 (e.g., along the X-axis). Each first inner longitudinal greasing groove 355-2 may define a longitudinal groove on the inner surface of first annulus body 322 (e.g., along the Y-axis). A second nested bushing 330 may comprise a second inner greasing groove 365 having one or more second inner circumferential greasing grooves 365-1 and/or one or more second inner longitudinal greasing grooves 365-2. Each second inner circumferential greasing groove 365-1 may define a circumferential groove on the inner surface of second annulus body 342 (e.g., along the X-axis). Each second inner longitudinal greasing groove 365-2 may define a longitudinal groove on the inner surface of second annulus body 342 (e.g., along the Y-axis).

Figure 3B:
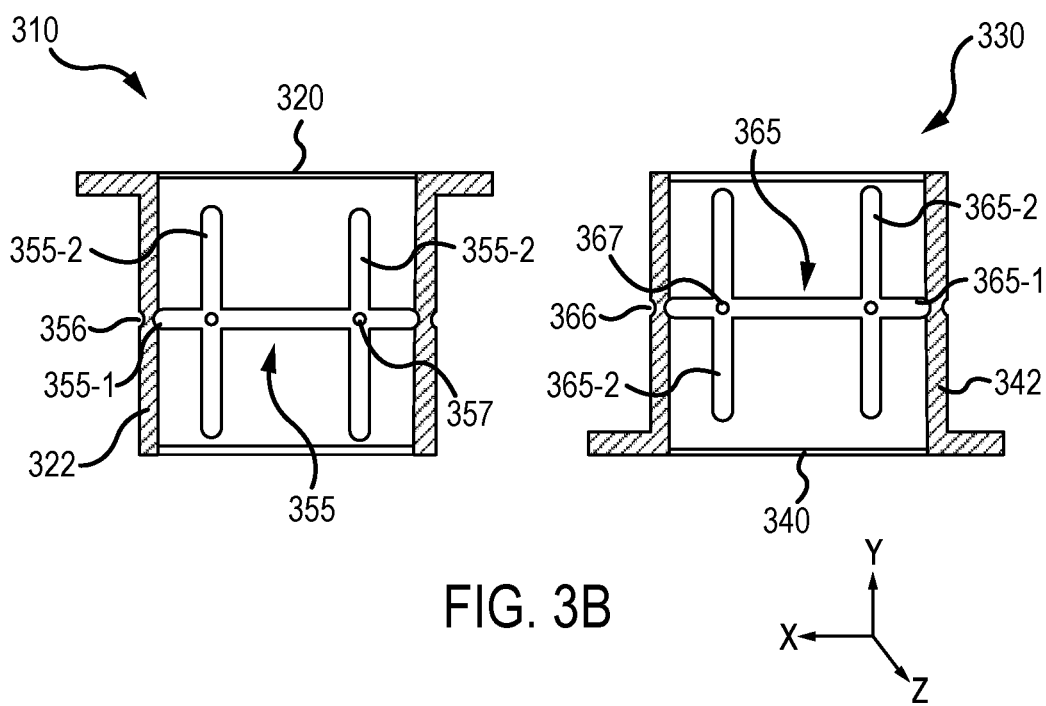
FIG. 3B illustrates a cross-sectional view of a nested bushing arrangement comprising inner and outer circumferential and longitudinal greasing grooves including greasing apertures, in accordance with various embodiments.

In various embodiments, and with reference to FIG. 3B, first nested bushing 310 may comprise one or more first greasing apertures 357. Each first greasing aperture 357 may define a void on the inner surface of first inner greasing groove 355. For example, each first greasing aperture 357 may define a void on the inner surface of first inner circumferential greasing groove 355-1 and/or first inner longitudinal greasing groove 355-2. In that respect, each first greasing aperture 357 may be located on the inner surface where first inner circumferential greasing groove 355-1 and/or first inner longitudinal greasing groove 355-2 intersect. First nested bushing 310 may also comprise a first outer greasing groove 356 having one or more first outer circumferential greasing grooves and/or one or more first outer longitudinal greasing grooves. In that regard, first outer greasing groove 356 may be similar to first inner greasing groove 355. In various embodiments, second nested bushing 330 may comprise one or more second greasing apertures 367. Each second greasing aperture 367 may define a void on the inner surface of second inner greasing groove 365. For example, each second greasing aperture 367 may define a void on the inner surface of second inner circumferential greasing groove 365-1 and/or second inner longitudinal greasing groove 365-2. In that respect, each second greasing aperture 367 may be located on the inner surface where second inner circumferential greasing groove 365-1 and/or second inner longitudinal greasing groove 365-2 intersect. Second nested bushing 330 may also comprise a second outer greasing groove 366 having one or more second outer circumferential greasing grooves and/or one or more second outer longitudinal greasing grooves. In that regard, second outer greasing groove 366 may be similar to second inner greasing groove 365.

Figure 4A:
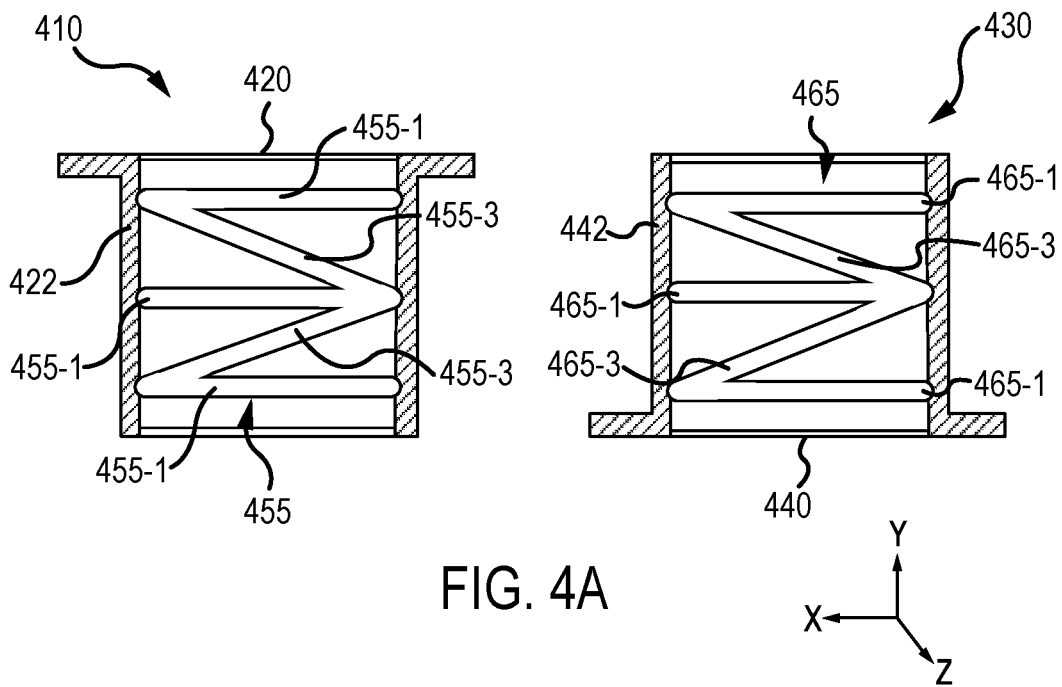
FIG. 4A illustrates a cross-sectional view of a nested bushing arrangement comprising inner circumferential and helical greasing grooves, in accordance with various embodiments.

As a further example, and with reference to FIG. 4A, a first nested bushing 410 may comprise a first inner greasing groove 455 having one or more first inner circumferential greasing grooves 455-1 and/or one or more first inner helical greasing grooves 455-3. Each first inner circumferential greasing groove 455-1 may define a circumferential groove on the inner surface of first annulus body 422 (e.g., along the X-Axis). Each first inner helical greasing groove 455-3 may define a helical groove on the inner surface of first annulus body 422. Each first inner helical greasing groove 455-3 may intersect with at least one of the first inner circumferential greasing grooves 455-1. A second nested bushing 430 may also comprise a second inner greasing groove 465 having one or more second inner circumferential greasing grooves 465-1 and/or one or more second inner helical greasing grooves 465-3. Each second inner circumferential greasing groove 465-1 may define a circumferential groove on the inner surface of second annulus body 442 (e.g., along the X-Axis). Each second inner helical greasing groove 465-3 may define a helical groove on the inner surface of second annulus body 442. Each second inner helical greasing groove 465-3 may intersect with at least one of the second inner circumferential greasing grooves 465-1.

Figure 4B:
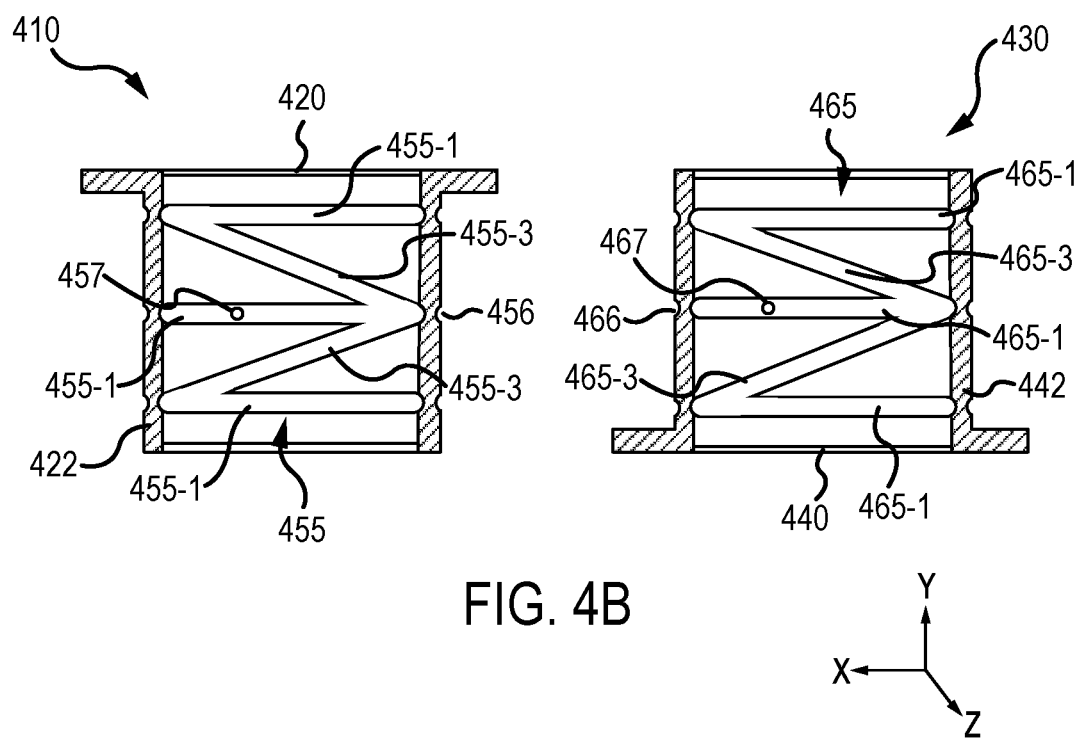
FIG. 4B illustrates a cross-sectional view of a nested bushing arrangement comprising inner and outer circumferential and helical greasing grooves including greasing apertures, in accordance with various embodiments.
Figure 5:
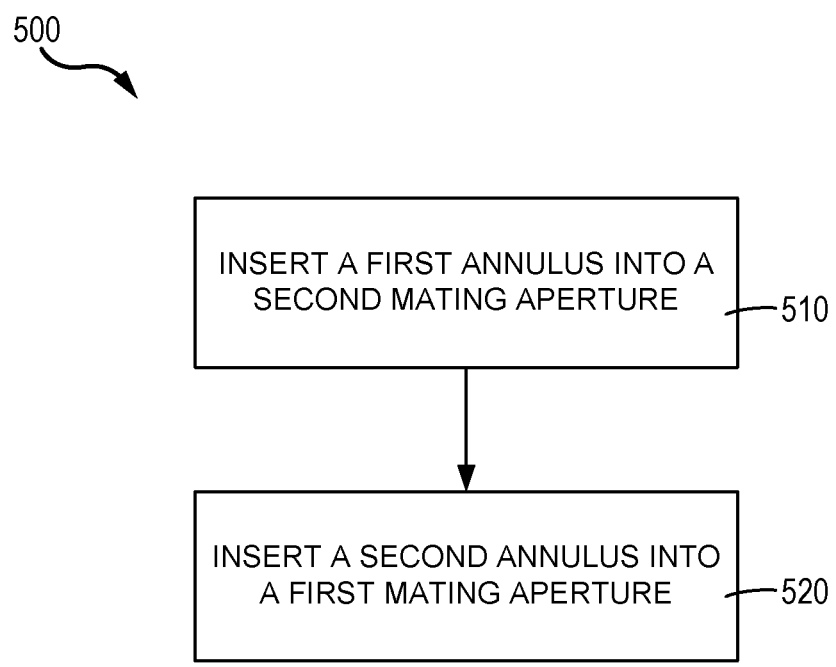
FIG. 5 illustrates a method of installing a nested bushing arrangement, in accordance with various embodiments.
Figure 6:
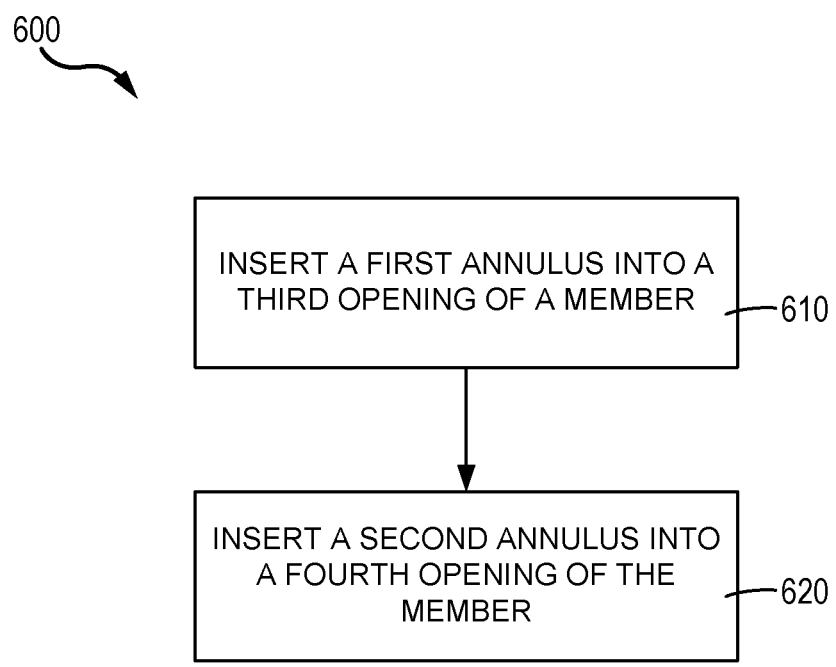
FIG. 6 illustrates a method of installing a nested bushing arrangement on to a member, in accordance with various embodiments.

In various embodiments, and with reference to FIG. 4B, first nested bushing 410 may comprise one or more first greasing apertures 457. Each first greasing aperture 457 may define a void on the inner surface of first inner greasing groove 455. For example, each first greasing aperture 457 may define a void on the inner surface of first inner circumferential greasing groove 455-1 and/or first inner helical greasing groove 455-3. First nested bushing 410 may also comprise a first outer greasing groove 456 having one or more first outer circumferential greasing grooves and/or one or more first outer helical greasing grooves. In that regard, first outer greasing groove 456 may be similar to first inner greasing groove 455. In various embodiments, second nested bushing 430 may comprise one or more second greasing apertures 467. Each second greasing aperture 467 may define a void on the inner surface of second inner greasing groove 465. For example, each second greasing aperture 467 may define a void on the inner surface of second inner circumferential greasing groove 465-1 and/or second inner helical greasing groove 465-3. Second nested bushing 330 may also comprise a second outer greasing groove 366 having one or more second outer circumferential greasing grooves and/or one or more second outer helical greasing grooves. In that regard, second outer greasing groove 466 may be similar to second inner greasing groove 465.

In various embodiments, and with reference to FIG. 5, and FIGS. 1A-1D, a method 500 for installing a nested bushing arrangement is disclosed. Method 500 may comprise inserting a first annulus into a second mating aperture (Step 510). For example, first annulus body 122 of first nested bushing 110 may be inserted into second mating aperture 138 of second nested bushing 130. Method 500 may comprise inserting a second annulus into a first mating aperture (Step 520). For example, second annulus body 142 of second nested bushing 130 may be inserted into first mating aperture 118 of first nested bushing 110. In various embodiments, first nested bushing 110 may be coupled to second nested bushing 130 using any suitable technique. For example, a press fit installation may be used wherein a lubricant is provided on to each of the first annulus body 122, second annulus body 142, first mating aperture 118, and/or second mating aperture 138, and the components are pressed together (e.g., using an arbor press and/or the like). As a further example, a shrink fit installation may be used wherein first nested bushing 110 and/or second nested bushing 130 are first cooled to a low temperature using dry ice or liquid nitrogen to allow each nested bushing to contract in size before installation, and expand in size post-installation. As a further example, first nested bushing 110 may be coupled to second nested bushing 130 using an adhesive, and/or through any other suitable technique.

In various embodiments, each of first nested bushing 110 and/or second nested bushing 130 may also be coupled to a member 150 (e.g., an object, a structural component, a lower lock link of a nose landing gear, etc.). In that respect, and with reference to FIG. 6, and FIGS. 1A-1D, a method 600 for installing a nested bushing arrangement on to a member 150, is disclosed. Method 600 may comprise inserting a first annulus into a third opening of a member 150 (Step 610). For example, first annulus body 122 of first nested bushing 110 may be inserted into the third opening of the member 150. An outer radial surface of first annulus body 122 may be sized and shaped to be press fitted, and/or through any other suitable coupling technique, into the third opening of the member 150. Method 600 may also comprise inserting a second annulus into a fourth opening of the member 150 (Step 620). For example, second annulus body 142 of second nested bushing 130 may be inserted into the fourth opening of the member 150. An outer radial surface of second annulus body 142 may be sized and shaped to be press fitted, and/or through any other suitable coupling technique, into the fourth opening of the member 150. The member 150 may thus be positionable between first body 115 of first nested bushing 110 and second body 135 of second nested bushing 130.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A nested bushing arrangement, comprising:
a first bushing having a first tubular portion and a first flange that extends radially from near a first longitudinal end of the first tubular portion, the first flange having a first opening;
a second bushing having a second tubular portion and a second flange that extends radially from near a first longitudinal end of the second tubular portion, the second flange having a second opening; and a member comprising a third opening and a fourth opening, the member disposed between the first flange and the second flange, wherein a first outer radial surface of the first tubular portion is press fitted into the third opening in the member, and wherein a second outer radial surface of the second tubular portion is press fitted into the fourth opening in the member, the first bushing and the second bushing being sized and configured to allow a second longitudinal end of the first tubular portion to extend at least partially through the second opening while a second longitudinal end of the second tubular portion extends at least partially through the first opening.

2. The nested bushing arrangement of claim 1, wherein an at least partial engagement of the first tubular portion into the second opening prevents rotation of the first bushing about the first tubular portion, and an at least partial engagement of the second tubular portion into the first opening prevents rotation of the second bushing about the second tubular portion.

3. The nested bushing arrangement of claim 1, wherein at least one of the first bushing and the second bushing is formed as a single component.

4. The nested bushing arrangement of claim 1, wherein at least one of the first bushing and the second bushing is additively manufactured.

5. The nested bushing arrangement of claim 1, wherein the first bushing and the second bushing are geometrically the same.

6. The nested bushing arrangement of claim 1, wherein the first tubular portion comprises at least one of a first inner greasing groove on a radially inner surface or a first outer greasing groove on the first outer radial surface of the first tubular portion.

7. The nested bushing arrangement of claim 6, wherein the first tubular portion comprises a first greasing groove defining an aperture on the first inner greasing groove or the first outer greasing groove.

8. The nested bushing arrangement of claim 1, wherein the second tubular portion comprises at least one of a second inner greasing groove on a radially inner surface or a second outer greasing groove on the second outer radial surface of the second tubular portion.

9. The nested bushing arrangement of claim 8, wherein the second tubular portion comprises a second greasing groove defining an aperture on the second inner greasing groove or the second outer greasing groove.

10. A nested bushing arrangement, comprising:
a first nested bushing having a first mating aperture defining a first void on a first outer surface of a flange end of the first nested bushing, and a first annulus defining a second void on the first outer surface of a first connecting end of the first nested bushing, wherein the first annulus comprises a first annulus body extending at a first length away from a first inner surface of the first nested bushing, and wherein the first mating aperture and the first annulus are separated by a first distance;

a second nested bushing having a second mating aperture defining a third void on a second outer surface of a flange end of the second nested bushing, and a second annulus defining a fourth void on the second outer surface of a second connecting end of the second nested bushing, wherein the second annulus comprises a second annulus body extending at a second length away from a second inner surface of the second nested bushing, wherein the second mating aperture and the second annulus are separated by a second distance; and a member comprising a first opening and a second opening, the member disposed between the first inner surface of the first nested bushing and the second inner surface of the second nested busing, wherein a first outer radial surface of the first annulus body press fitted into the first opening in the member, and wherein a second outer radial surface of the second annulus body is press fitted into the second opening in the member, wherein the first nested bushing is configured to be coupled to the second nested bushing by inserting the first annulus body into the second mating aperture and the second annulus body into the first mating aperture.

11. The nested bushing arrangement of claim 10, wherein the first distance is approximately equal to the second distance.

12. The nested bushing arrangement of claim 10, wherein the first annulus comprises at least one of a first inner greasing groove on an inner surface of the first annulus body or a first outer greasing groove on an outer surface of the first annulus body, and wherein the first annulus comprises a first greasing aperture defining a fifth void on the first inner greasing groove, wherein the first greasing aperture is configured to provide a fluid to at least one of the first inner greasing groove or the first outer greasing groove.

13. The nested bushing arrangement of claim 10, wherein the second annulus comprises at least one of a second inner greasing groove on an inner surface of the second annulus body or a second outer greasing groove on an outer surface of the second annulus body, and wherein the second annulus comprises a second greasing aperture defining a sixth void on the second inner greasing groove, wherein the second greasing aperture is configured to provide a fluid to at least one of the second inner greasing groove or the second outer greasing groove.

14. The nested bushing arrangement of claim 10, wherein the first nested bushing is coupled to the second nested bushing using a shrink fit installation process.

15. The nested bushing arrangement of claim 10, wherein the first nested bushing is coupled to the second nested bushing using a press fit installation process.

16. The nested bushing arrangement of claim 10, wherein at least one of the first nested bushing and the second nested bushing is additively manufactured.

* * * * *